US006503412B1

(12) United States Patent
Schroeder

(10) Patent No.: US 6,503,412 B1
(45) Date of Patent: Jan. 7, 2003

(54) SOFTENING COMPOSITION

(75) Inventor: Wen Schroeder, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/645,644

(22) Filed: Aug. 24, 2000

(51) Int. Cl.[7] .......................... D06M 11/77; C11D 3/37
(52) U.S. Cl. ...................... 252/8.86; 442/102; 510/466
(58) Field of Search .......................... 442/102; 427/411; 252/8.86; 134/122 R; 162/164.4; 510/466

(56) References Cited

U.S. PATENT DOCUMENTS

| | | | |
|---|---|---|---|
| 3,722,469 A | | 3/1973 | Bartley et al. |
| 3,865,078 A | | 2/1975 | De Howitt et al. |
| 3,905,329 A | | 9/1975 | Cone et al. |
| 3,930,465 A | | 1/1976 | Schuierer |
| 4,005,028 A | * | 1/1977 | Heckert et al. ............... 252/99 |
| 4,005,030 A | * | 1/1977 | Heckert et al. ............. 252/140 |
| 4,016,831 A | | 4/1977 | James et al. |
| 4,023,526 A | | 5/1977 | Ashmus et al. |
| 4,061,001 A | | 12/1977 | Von der Eltz et al. |
| 4,081,318 A | | 3/1978 | Wietsma |
| 4,089,296 A | | 5/1978 | Barchi |
| 4,099,913 A | | 7/1978 | Walter et al. |
| 4,118,526 A | | 10/1978 | Gregorian et al. |
| 4,158,076 A | | 6/1979 | Wallsten |
| 4,159,355 A | | 6/1979 | Kaufman |
| 4,184,914 A | | 1/1980 | Jenkins |
| 4,193,762 A | | 3/1980 | Namboodri |
| 4,198,316 A | | 4/1980 | Nahta |
| 4,237,818 A | | 12/1980 | Clifford et al. |
| 4,279,964 A | | 7/1981 | Heller |
| 4,297,860 A | | 11/1981 | Pacifici et al. |
| 4,305,169 A | | 12/1981 | Vidalis |
| 4,343,835 A | | 8/1982 | Jones et al. |
| 4,348,251 A | | 9/1982 | Pauls et al. |
| 4,364,784 A | | 12/1982 | Van Wersch et al. |
| 4,366,682 A | | 1/1983 | Keller |
| 4,384,867 A | | 5/1983 | Grüber |
| 4,385,954 A | | 5/1983 | Pauls et al. |
| 4,387,118 A | | 6/1983 | Shelton |
| 4,400,953 A | | 8/1983 | Driessen et al. |
| 4,402,200 A | | 9/1983 | Clifford et al. |
| 4,435,965 A | | 3/1984 | Sasseville et al. |
| 4,440,808 A | | 4/1984 | Mitter |
| 4,442,771 A | | 4/1984 | Mitter |
| 4,444,104 A | | 4/1984 | Mitter |
| 4,453,462 A | | 6/1984 | Mitter |
| 4,463,467 A | | 8/1984 | Grüber et al. |
| 4,463,583 A | | 8/1984 | Krüger et al. |
| 4,474,110 A | | 10/1984 | Rosner |
| 4,497,273 A | | 2/1985 | Mitter |
| 4,498,318 A | | 2/1985 | Mitter |
| 4,501,038 A | | 2/1985 | Otting |
| 4,502,304 A | | 3/1985 | Hopkins |
| 4,534,189 A | | 8/1985 | Clifford |
| 4,552,778 A | | 11/1985 | Zimmer |
| 4,557,218 A | | 12/1985 | Sivers |
| 4,559,243 A | | 12/1985 | Pässler et al. |
| 4,571,360 A | | 2/1986 | Brown et al. |
| 4,576,112 A | | 3/1986 | Funger et al. |
| 4,581,254 A | | 4/1986 | Cunningham et al. |
| 4,597,831 A | | 7/1986 | Anderson |
| 4,612,874 A | | 9/1986 | Mitter |
| 4,646,675 A | | 3/1987 | Arthur et al. |
| 4,655,056 A | | 4/1987 | Zeiffer |
| 4,665,723 A | | 5/1987 | Zimmer |
| 4,667,882 A | | 5/1987 | Pacifici |
| 4,731,092 A | | 3/1988 | Berendt |
| 4,734,100 A | | 3/1988 | Berendt et al. |
| 4,741,739 A | | 5/1988 | Berendt et al. |
| 4,762,727 A | | 8/1988 | Voswinckel |
| 4,773,110 A | | 9/1988 | Hopkins |
| 4,792,619 A | | 12/1988 | Berendt et al. |
| 4,799,278 A | | 1/1989 | Beeh |
| 4,833,748 A | | 5/1989 | Zimmer et al. |
| 4,872,325 A | | 10/1989 | Moser et al. |
| 4,894,118 A | | 1/1990 | Edwards et al. |
| 4,912,948 A | | 4/1990 | Brown et al. |
| 4,921,895 A | * | 5/1990 | Schaefer et al. ............. 524/379 |
| 5,008,131 A | | 4/1991 | Bakhshi |
| 5,009,932 A | | 4/1991 | Klett et al. |
| 5,048,589 A | | 9/1991 | Cook et al. |
| 5,089,296 A | | 2/1992 | Bafford et al. |
| 5,145,527 A | | 9/1992 | Clifford et al. |
| 5,165,261 A | | 11/1992 | Cho |
| 5,219,620 A | | 6/1993 | Potter et al. |
| 5,340,609 A | | 8/1994 | Arthur et al. |
| 5,366,161 A | | 11/1994 | Potter et al. |
| 5,399,412 A | | 3/1995 | Sudall et al. |
| 5,492,655 A | | 2/1996 | Morton et al. |
| 5,510,001 A | | 4/1996 | Hermans et al. |
| 5,552,020 A | | 9/1996 | Smith et al. |
| 5,591,309 A | | 1/1997 | Rugowski et al. |
| 5,667,636 A | | 9/1997 | Engel et al. |
| 5,840,403 A | | 11/1998 | Trokhan et al. |
| 5,861,143 A | | 1/1999 | Peterson et al. |
| 5,869,075 A | | 2/1999 | Krzysik |
| 5,985,434 A | | 11/1999 | Qin et al. |
| 6,017,417 A | | 1/2000 | Wendt et al. |
| 6,080,686 A | * | 6/2000 | Floyd .......................... 442/102 |

FOREIGN PATENT DOCUMENTS

| | | |
|---|---|---|
| DE | 252208 | 10/1911 |
| EP | 0047908 A1 | 3/1982 |
| EP | 0098362 B1 | 1/1984 |
| EP | 0120472 A1 | 10/1984 |
| EP | 0336439 A2 | 10/1989 |

* cited by examiner

Primary Examiner—John Hardee
(74) Attorney, Agent, or Firm—Dority & Manning, P.A.

(57) ABSTRACT

The present invention is generally directed to a softening composition that can be applied to a fibrous web, such as a tissue. In one embodiment, the softening composition contains up to about 40% by weight of a silicone polymer, up to about 20% by weight of a silicone polyether, up to about 20% by weight of a softness-enhancing agent; and up to about 40% by weight of a solvent. Other components, such as odor control agents, foaming aids, etc., can also be incorporated into the softening composition.

37 Claims, No Drawings

SOFTENING COMPOSITION

BACKGROUND OF THE INVENTION

Consumers use paper wiping products, such as tissues, for a wide variety of applications. For example, various types of tissues can be used for applications, such as for nose care, cosmetics, eyeglass cleaning, etc. Typically, a user of such tissues requires that they possess a relatively soft feel. In the past, various mechanisms have been utilized to produce tissues having a soft feel. For example, in many cases, a tissue is softened through the application of a chemical additive (i.e., softener) that is capable of enhancing the soft feel of the tissue product. However, one problem associated with some conventional softeners is the relative difficulty in applying the softeners to a tissue. For instance, many softeners contain components that cause the composition to be formed as a solid or semi-solid. To facilitate application of such solid or semi-solid compositions to a tissue, extensive heating is typically required. Moreover, even after extensive heating, the softeners often readily re-solidify upon returning to room temperature.

As such, a need currently exists for an improved softening composition that can be applied to a tissue, such as a bath tissue, to enhance the softness of the tissue.

SUMMARY OF THE INVENTION

The present invention recognizes and addresses the foregoing drawbacks, and deficiencies of prior art constructions and methods. The present invention is generally directed to a softening composition that can be applied to a tissue to enhance the softness of the tissue. For example, in one embodiment, the softening composition is formed from a mixture of a silicone polymer, a surfactant, a softness-enhancing agent, and a solvent.

For example, in one embodiment, the silicone polymer used in a softening composition of the present invention is typically cationic so as to aid in the attachment of the composition to the cellulosic fibers of a tissue. For example, in one embodiment, the silicone polymer can be a silicone diquaternary ammonium salt. In general, the silicone polymer can be incorporated into the softening composition in any desired amount. In particular, a softening composition of the present invention usually contains up to about 40% by weight of a silicone polymer, and particularly from about 15% to about 30% by weight. In some instances, the silicone polymer can have antistatic properties to reduce static build-up.

In addition to a silicone polymer, a softening composition of the present invention may also contain a surfactant. In general, any type of surfactant (i.e., nonionic, ionic, cationic, or amphoteric) may be used in the present invention. For example, in one embodiment, the surfactant is a nonionic silicone polyether. In general, the surfactant can be incorporated into the softening composition in any desired amount. In particular, a softening composition of the present invention usually contains up to about 20% by weight of a surfactant, and particularly from about 5% to about 15% by weight.

In some embodiments of the present invention, the chemistry of the surfactant can be varied to alter various characteristics of the surfactant. For example, the n/m ratio (i.e., ratio of propyoxylate groups to ethyoxylate), the molecular weight, the cloud point, etc., may be varied in accordance with the present invention. For instance, by decreasing the n/m ratio, the hydrophilicity of the surfactant is increased. Moreover, by increasing the hydrophilic nature of the surfactant, the softening composition may be applied to a tissue without substantially decreasing the water absorption capabilities of the tissue.

As stated, a softening composition of the present invention also typically contains a softness-enhancing agent to increase the softness of the tissue. For example, some suitable softness-enhancing agents include, but are not limited to, quaternary ammonium compounds, cellulose esters, monosaccharide ester compounds, phospholipid compounds, etc. In general, the softness-enhancing agent can be incorporated into the softening composition in any desired amount. In particular, a softening composition of the present invention usually contains up to about 20% by weight of a softness-enhancing agent, and particularly from about 5% to about 15% by weight.

In some embodiments of the present invention, the chemistry of the softness-enhancing agent can be varied to alter various characteristics of the softness-enhancing agent. For example, the carbon chain length of the agent may be varied in accordance with the present invention. In particular, a softness-enhancing agent used in the present invention usually has a carbon chain between 8 to 24 carbon atoms in length, and particularly between 12 to 24 carbon atoms.

Besides the above-mentioned components, a softening composition of the present invention may also contain a solvent. In general, any water and/or alcohol-based compounds can be utilized in the present invention. For example, some suitable solvents include, but are not limited to, water, methanol, ethanol, propanol, isopropanol, glycerin, propylene glycol, ethylene glycol, polypropylene glycol, polyethylene glycol, 1,3-methyl propanediol, isopentyldiol, etc. Moreover, a solvent of the present invention can also generally be incorporated within the softening composition in various amounts. In particular, the solvent can be utilized in the softening composition in amounts up to about 40% by weight of the composition, and particularly between about 15% to about 30% by weight.

Other ingredients may also be incorporated into the softening composition as desired. For example foaming aids may be utilized when foaming the composition onto a tissue. Moreover, various compositions that mask, inhibit, or prevent certain odors may also be incorporated into the softening composition.

Other features and aspects of the present invention are discussed in greater detail below.

DETAILED DESCRIPTION OF REPRESENTATIVE EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

In general, the present invention is directed to a softening composition that can be applied to a tissue, such as bath tissue, to enhance the softness of the tissue. Moreover, various components can be utilized in conjunction with softening composition to provide the tissue with certain desired characteristics. For instance, in one embodiment, an odor control agent can be combined with the softening composition and applied to a bath tissue to wipe or clean the genital and perianal areas. A softening composition of the present invention generally includes a silicone polymer, a surfactant, a softness-enhancing agent, and a solvent.

In accordance with the present invention, the softening composition can generally contain any of a variety of different silicone polymers. In some embodiments, the silicone polymer can be cationic such that it is more substantive to the cellulosic fibers of certain substrates, such as tissue products. In particular, because a tissue typically contains cellulosic fibers that are anionic in nature, a cationic silicone polymer can allow the softening composition to more easily bond to the tissue. Moreover, a cationic silicone polymer can also enhance the ability of the cellulosic fibers of the tissue to retain other non-cationic components, such as non-ionic surfactants. In certain instances, the silicone polymer can also contain antistatic properties to enhance the lubricating and conditioning affect of the composition. Further, the silicone polymer can also aid in improving the softness and water solubility and/or dispersibility of the tissue.

In some instances, the silicone polymer used in the present invention has one or more amino groups that are linked together by various elements. For example, diquaternary and polyquaternary ammonium compounds can be used as the silicone polymer. Particular examples of silicone polymers that can be used in a softening composition of the present invention are silicone diquaternary ammonium salts. For instance, one embodiment of a silicone diquaternary ammonium salt that can be used in the present invention is shown below as formula (1):

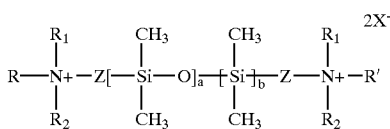

wherein, a, b ≧ 0 and a+b ≧ 1;

$R_1$ and $R_2$ are independently selected from $C_1$–$C_6$ alkyls and $C_1$–$C_6$ hydroxyalkyls. In general, the $C_1$–$C_6$ alkyls and/or $C_1$–$C_6$ hydroxyalkyls may be linear or branched. Moreover, although not required, in some embodiments, the $C_1$–$C_6$ alkyls and/or $C_1$–$C_6$ hydroxyalkyls may be substituted with any of a variety of substituents.

wherein R and R' are independently selected from $C_8$–$C_{24}$ aliphatic hydrocarbons. In general, the $C_8$–$C_{24}$ aliphatic hydrocarbons may be linear or branched. Moreover, although not required, in some embodiments, the $C_8$–$C_{24}$ aliphatic hydrocarbons may be substituted with any of a variety of substituents.

wherein Z is a substituent containing the following formula (2):

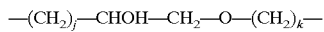

where j ≧ 1 and k ≧ 1;

and wherein X can be selected from any suitable ion, such as chloride, methylsulfate, ethylsulfate, acetate, lactate, etc.

Depending on the desired characteristics of the tissue, a silicone polymer used in the present invention can be incorporated within the softening composition in various amounts. In particular, the silicone polymer can be utilized in the softening composition in amounts up to about 40% by weight of the composition. In some embodiments, the silicone polymer comprises from about 15% to about 30% of the weight of the softening composition.

By utilizing a silicone polymer, such as described above, in a softening composition of the present invention, a tissue to which the composition is applied can be imparted with a variety of beneficial properties.

As stated above, a softening composition of the present invention also generally includes a surfactant. As used herein, a "surfactant" generally refers to a surface-active substance that can reduce surface tension. The surfactant can be nonionic, ionic, cationic, or amphoteric. In general, the surfactant is capable of reducing the surface tension of the softening composition, thereby rendering a more stable composition. In particular, nonionic surfactants, such as silicone polyethers, are particularly useful when incorporated into a composition of the present invention. For example, one suitable nonionic silicone polyether compound can include a dimethicone copolyol, such as shown below as formula (3):

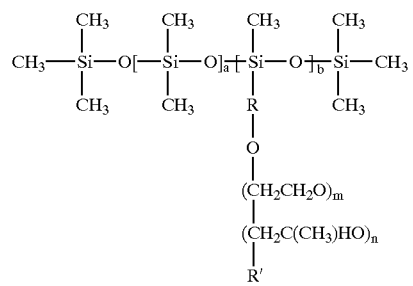

wherein, a, b ≧ 1;

R is selected from $C_1$–$C_6$ alkyls and $C_1$–$C_6$ hydroxyalkyls. In general, the $C_1$–$C_6$ alkyls and $C_1$–$C_6$ hydroxyalkyls may be linear or branched. Moreover, although not required, in some embodiments, the $C_1$–$C_6$ alkyls and $C_1$–$C_6$ hydroxyalkyls may be substituted with any of a variety of substituents.

wherein R' is selected from hydrogen, $C_1$–$C_6$ alkyls, and $C_1$–$C_6$ hydroxyalkyls. In general, the $C_1$–$C_6$ alkyls and/or $C_1$–$C_6$ hydroxyalkyls may be linear or branched. Moreover, although not required, in some embodiments, the $C_1$–$C_6$ alkyls and $C_1$–$C_6$ hydroxyalkyls may be substituted with any of a variety of substituents.

wherein m is between about 1 to about 500; and n is between about 0 to about 300.

In some embodiments, the "n/m ratio" can be adjusted to control the water absorption characteristics or hydrophilicity of the surfactant. As used herein, the "n/m ratio" refers generally to the ratio of propyoxylate groups (i.e., —$CH_2$—$C(CH_3)HO$—) to ethyoxylate groups (i.e., —$CH_2$—$CH_2$—O—) in a dimethicone copolyol component as shown above in formula (3). In particular, by decreasing the m/n ratio, the resulting dimethicone copolyol can become more hydrophilic (i.e., having an affinity for water). In turn, a softening composition that is incorporated with the relatively hydrophilic dimethicone copolyol can also be made to be more compatible with an aqueous environment. As a result, because the composition has some affinity for water, it can generally be applied to a tissue without causing a substantial decrease in the absorbency (i.e., hydrophilic) properties of the tissue. In this regard, the n/m ratio of a dimethicone copolyol used in a softening composition of the present invention can, in some embodiments, be less than about 1, particularly less than about 0.50, and more particularly less than about 0.25. For example, in one embodiment, the dimethicone copolyol is formulated to have a n/m ratio of 0.25, wherein m is about 80 and n is about 20. In another embodiment, the m/n ratio can be about 0.67 where m is about 60 and n is about 40.

In general, a surfactant of the present invention can be incorporated within the softening composition in various amounts. In particular, the surfactant is typically utilized in the softening composition in amounts up to about 20% by weight of the composition. In some embodiments, the surfactant comprises from about 5% to about 15% of the weight of the softening composition.

In addition, the molecular weight of the surfactants utilized in the present invention can also vary. For instance, dimethicone copolyols having a higher molecular weight (e.g., greater than about 10,000) tend to feel tacky, while dimethicone copolyols having a lower molecular weight (e.g., less than about 8,000) tend to feel slippery or silky. The molecular weight may affect other properties as well, such as intrinsic viscosity, emulsifying capability, etc. Thus, to achieve a tissue having a particularly desired hand feel, the molecular weight of the surfactant can be selectively varied. For example, in some embodiments, the molecular weight of the surfactant can range from about 400 to about 20,000, particularly from about 500 to about 10,000, and more particularly from about 1,000 to about 8,000. Moreover, besides, or in conjunction with varying the molecular weight of the surfactant, the m/n ratio can also be varied, as stated above, to further assist the attainment of a particular hand feel.

Further, in some embodiments, the surfactant can be appropriately selected so that its "cloud point" is controlled. As used herein, the "cloud point" generally refers to the temperature at which a material will precipitate out of solution. By controlling the cloud point of the surfactant, the softening composition can be made more compatible with the selected method of application. For instance, by decreasing the m/n ratio, the cloud point may be decreased, and conversely, by increasing the m/n ratio, the cloud point may be increased.

In one embodiment, for example, as described in more detail below, a softening composition can be applied to a tissue by spraying or printing the composition onto the tissue. When applying the softening composition by spraying or printing, it is typically desired to minimize the cloud point of the surfactant incorporated within the composition so as to limit foaming thereof. Thus, when it is desired to minimize foaming of the composition, a surfactant having a low cloud point is generally selected. For example, in one embodiment, dimethicone copolyols having a cloud point less than about 50° C. can be utilized. In particular, dimethicone polyols having a cloud point less than about 30° C., and more particularly less about 15° C., can be utilized. Some examples of such surfactants include Abil B8852 (cloud point is less than about 15° C. and the n/m ratio is about 0.25, where m=80 and n=20) and Abil B8863 (cloud point between about 37° C. to about 47° C. and the n/m ratio is about 0.67, where m=60 and n=40), both of which are made by Goldschmidt Corp.

On the other hand, when the softening composition is applied to a tissue using certain other methods of application, it may be desired to maximize the cloud point of the surfactant to enhance foaming of the composition. For instance, in one embodiment, a softening composition can be "foamed" onto the tissue. In this embodiment, the cloud point of the surfactant is typically maximized to ensure adequate foaming. For example, dimethicone polyols having a cloud point greater than about 20° C. can be utilized in one embodiment of the present invention. In particular, dimethicone polyols having a cloud point greater than about 30° C., and more particularly greater than about 50° C., can be utilized. One example of such a surfactant is Abil B8843 (cloud point is greater than about 85° C. and the n/m ratio is 0 where n=0 and m=100) made by Goldschmidt Corp.

In addition to a surfactant and a silicone polymer, a softening composition of the present invention also generally includes a softness-enhancing agent. Softness-enhancing agents can provide numerous benefits to the softening composition. For instance, the agents can further enhance the hand feel or softness of a tissue when applied thereto. Moreover, these agents can also aid in formulating the softening composition by aiding in solubilizing, stabilizing, emulsifying, suspending, dispersing, etc. Further, in some embodiments, cationic and/or amphoteric agents can enhance the ability of the softening composition to bond to cellulosic fibers of the tissue. In some embodiments, agents can be utilized that also act as anti-microbial agents, some of which are described in more detail below.

In general, any of a wide variety of softness-enhancing agents can be utilized in a softening composition of the present invention. For instance, some suitable softness-enhancing agents can include, but are not limited to, quaternary ammonium compounds, imidazolinium compounds, bis-imidazolinium compounds, diquaternary ammonium compounds, polyquaternary ammonium compounds, phospholipids, fatty acid esters of sorbitan and sugar, for example, combinations thereof, and the like. Some specific examples of suitable softness-enhancing agents are given below:

1. Quaternary ammonium compounds having the following basic structure:

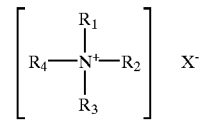

Wherein

X=halide, methyl sulfate, ethyl sulfate, lactate, or other compatible counterion;

R1 can be hydrogen, $C_1$–$C_6$ alkyl or hydroxyalkyl; and

R2, R3, R4 can be the same or different, any linear or branched, saturated or unsaturated, substituted or non-substituted, with or without ethoxylation, with or without propoxylation, aliphatic hydrocarbon moiety of greater than 8 carbon chain length, preferably between 8–30 carbon chain length;

or

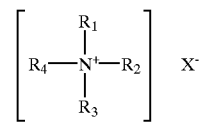

Wherein

X=halide, methyl sulfate, ethyl sulfate, lactate, or other compatible counterion;

R1, R2 can be the same or different, hydrogen, $C_1$–$C_6$ alkyl or hydroxyalkyl; or $R_1$ can be hydrogen, $C_1$–$C_6$ alkyl or hydroxyalkyl;

R2 can be benzyl or epoxy; and

R3, R4 can be the same or different, any linear or branched, saturated or unsasturated, substituted or non-substituted, with or without ethoxylation, with or without propoxylation, aliphatic hydrocarbon moiety of greater than 8 carbon chain length, preferably between 8–30 carbon chain length;

or $$\left[ R_4\!-\!\overset{R_1}{\underset{R_3}{N^+}}\!-\!R_2 \right] \quad X^-$$

Wherein

X=halide, methyl sulfate, ethyl sulfate, lactate, or other compatible counterion;

R1, R2, R3 can be the same or different, hydrogen, $C_1$–$C_6$ alkyl or hydroxyalkyl; R4 can be any linear or branched, saturated or unsasturated, substituted or non-substituted, with or without ethoxylation, with or without propoxylation, aliphatic hydrocarbon moiety 5 of greater than 8 carbon chain length, preferably between 8–30 carbon chain length;

2. Quatemary ammonium compounds having the following basic structure:

$$\left[ R_4\!-\!\overset{R_1}{\underset{R_3}{N^+}}\!-\!R_2 \right] \quad X^-$$

Wherein

X=halide, methyl sulfate, ethyl sulfate, lactate, or other compatible counterion;

R1, R2, R3 can be the same or different, hydrogen, $C_1$–$C_6$ alkyl or hydroxyalkyl; and R4 are selected from any of the following two groups:

$$-(CH_2)n\begin{cases}(CH_2)m-O-\underset{O}{\overset{\|}{C}}-R_5 \\ (CH_2)p-O-\underset{O}{\overset{\|}{C}}-R_6\end{cases}$$

$$-(CH_2)n\begin{cases}(CH_2)m-\underset{H}{\overset{|}{N}}-\underset{O}{\overset{\|}{C}}-R_5 \\ (CH_2)p-\underset{H}{\overset{|}{N}}-\underset{O}{\overset{\|}{C}}-R_6\end{cases}$$

n=2–6;
m=0–6
p=1–6; and

R5, R6 can be the same or different, any linear or branched, saturated or unsasturated, substituted or non-substituted, with or without ethoxylation, with or without propoxylation, aliphatic hydrocarbon moiety of greater than 8 carbon chain length, preferably between 8–30 carbon chain length or $$\left[ R_4\!-\!\overset{R_1}{\underset{R_3}{N^+}}\!-\!R_2 \right] \quad X^-$$

Wherein

X=halide, methyl sulfate, ethyl sulfate, lactate, or other compatible counterion;

R1, R2 can be the same or different, hydrogen, $C_1$–$C_6$ alkyl or hydroxyalkyl; and R3, R4 can be selected in any combination from the following two groups:

$$-(CH_2)m-O-\overset{O}{\overset{\|}{C}}-R_5 \qquad -(CH_2)m-\overset{H}{\overset{|}{N}}-\overset{O}{\overset{\|}{C}}-R_5$$

m=2–6; and

R5 can be any linear or branched, saturated or unsasturated, substituted or non-substituted, with or without ethoxylation, with or without propoxylation, aliphatic hydrocarbon moiety of greater than 8 carbon chain length, preferably between 8–30 carbon chain length.

3. Quaternary ammonium compounds having the following basic structure:

$$\left[ R\!-\!HN^+\!\!\begin{matrix}C_2H_4\\ \diagdown\\ \diagup\\ C_2H_4\end{matrix}\!O \right] \quad X^-$$

wherein

X=halide, methyl sulfate, ethyl sulfate, lactate, or other compatible counterion;

R is selected from the following group:

$$-(CH_2)m-\overset{H}{\overset{|}{N}}-\overset{O}{\overset{\|}{C}}-R_5$$

m=2–6; and

R5 can be any linear or branched, saturated or unsaturated, substituted or non-substituted, with or without ethoxylation, with or without propoxylation, aliphatic hydrocarbon moiety of greater than 8 carbon chain length, preferably between 8–30 carbon chain length.

4. Imidazolinium compounds having the following basic structures:

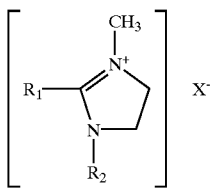

wherein
X=halide, methyl sulfate, ethyl sulfate, lactate, or other compatible counterion;
R1 can be any linear or branched, saturated or unsaturated, substituted or non-substituted, with or without ethoxylation, with or without propoxylation, aliphatic hydrocarbon moiety of greater than 8 carbon chain length, preferably between 8–30 carbon chain length; and R2 can be selected from any of the following two groups:

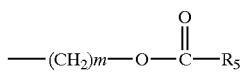 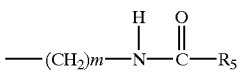

m=2–6; and
R5 can be any linear or branched, saturated or unsaturated, substituted or non-substituted, with or without ethoxylation, with or without propoxylation, aliphatic hydrocarbon moiety of greater than 8 carbon chain length, preferably between 8–30 carbon chain length.

5. Bis-imidazolinium compounds having the following basic structure:

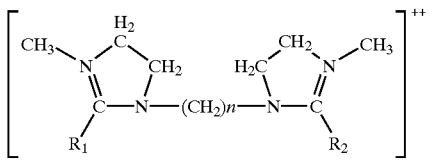

Wherein
X=halide, methyl sulfate, ethyl sulfate, lactate, or other compatible counterion;
R1, R2 can be the same or different, aliphatic hydrocarbons, linear or branched, saturated or unsaturated, substituted or non-substituted, with or without ethoxylation, with or without propoxylation, preferably C8–C30; or
R1, R2 can be selected in any combination from any of the following two groups:

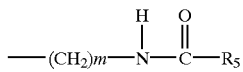 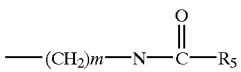

m=2–6; and
R5 can be any linear or branched, saturated or unsaturated, substituted or non-substituted, with or without ethoxylation, with or without propoxylation, aliphatic hydrocarbon moiety of greater than 8 carbon chain length, preferably between 8–30 carbon chain length.

6. Diquaternary ammonium compounds having the following basic structure

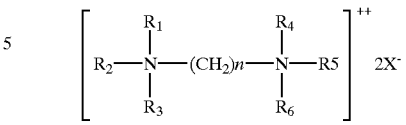

Wherein
X=halide, methylsulfate, ethylsulfate or other compatible counterion; n=2–8;
R, R4 may be the same or different, are H, $CH_3$, or $(CH_2)_mOH$ where m=1–4;
R2, R3, R5, R6 may be the same or different, are from the following groups:
(i) $(CH_2)_p$ OH, where p=1–6;
or (ii).

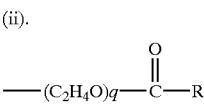

where q=1–10, R=aliphatic, C8–C30, saturated or unsaturated, normal or branched;
or (iii).

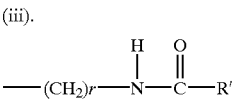

where r=1–10, R'=aliphatic, C8–C30, saturated or unsaturated, normal or branched;
or (iv).

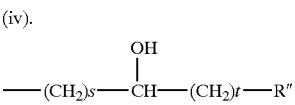

where s=1–10, t=1–4, R"=aliphatic, C8–C30, saturated or unsaturated, normal or branched.

7. Polyquaternary ammonium compounds having the following basic structure:

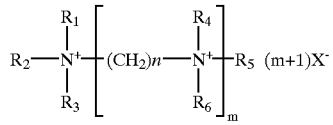

Wherein
X=halide, methylsulfate, ethylsulfate or other compatible counterion;
n=2–8;
m=1 or greater;
R2, R5 may be the same or different, are aliphatic, C8–C30, saturated or unsaturated, normal or branched;
or $(CH_2)_q$—CHOH—R' where q=1–6, and R'=aliphatic, C8–C30, saturated or unsaturated, normal or branched;
or $(CH_2)_r$—O—R" where r=1–6, and R"=aliphatic, C8–C30, saturated or unsaturated, normal or branched; and
R1, R4, R3, R6 may be the same or different, are H, $CH_3$, or $(CH_2)_mOH$ where m=1–6; or aliphatic, C8–C30, saturated or unsaturated, normal or branched.

8. Phospholipid Derivatives having the following basic structure:

$$\left[ R-\underset{\underset{R_2}{|}}{\overset{\overset{R_1}{|}}{N^+}}-CH_2CHOHCH_2O-\overset{\overset{O}{\|}}{\underset{}{P}}-(B)y \right]_x + xA + aM \quad (1)$$

wherein,
x=1–3;
x+y=3;
a=0–2;
B=O⁻ or OM;
A=an anion;
M=a cation;
R, R1, R2 can be the same or different, are alkyl, substituted alkyl, alkyl aryl or alkenyl groups of up to 30 carbon atoms;

or $$\left[ R-\underset{\underset{R_2}{|}}{\overset{\overset{R_1}{|}}{N^+}}-CH_2CHOHCH_2O-\overset{\overset{O}{\|}}{\underset{}{P}}-(B)y \right]_x + xA + aM \quad (2)$$

wherein
x=1–3;
x+y=3;
a=0–2;
B=O⁻ or OM;
A=an anion;
M=a cation;
R1, R2 can be the same or different, are alkyl, hydroxyalkyl, carboxyalkyl, C1–C6, or propoxyalkylene, C1–C10; or
R1, R2 and the nitrogen they are attached to may represent an N-heterocycle; and
R has the following structure:

$$-(CH_3)m-\underset{\underset{}{\overset{|}{R_4}}}{N}-\overset{\overset{O}{\|}}{C}-R_5$$

wherein
m=2–6;
R4=hydrogen or alkyl, hydroxyalkyl or alkenyl of up to 6 carbons, or cycloalkyl of up to 6 carbons or polyoxyalkylene; and R5=alkyl, alkenyl, alkoxy or hydroxyalkyl, C5–C30, or aryl or alkylaryl of up to C30.

or $$\left[ R-\underset{\underset{R_2}{|}}{\overset{\overset{R_1}{|}}{N^+}}-CH_2CHOHCH_2O-\overset{\overset{O}{\|}}{\underset{\underset{}{OM}}{P}}-OCH_2CHOHCH_2-\underset{\underset{R_2}{|}}{\overset{\overset{R_1}{|}}{N^+}}-R' \right]^{++} 2A^- \quad (3)$$

wherein
A=an anion;
M=a cation;
R, R1, R2 can be the same or different, are alkyl, substituted alkyl, alkyl aryl or alkenyl groups of up to 30 carbons; and R' has the following structure:

$$-(CH_2)m-\underset{\underset{}{\overset{|}{R_4}}}{N}-\overset{\overset{O}{\|}}{C}-R_6$$

wherein
m=2–6;
R4=hydrogen or alkyl, hydroxyalkyl or alkenyl or of up 6 carbons, or cycloalkyl of up to 6 carbons or polyoxyalkylene; and R6 has the following structure:

[structure showing pyrrolidinone-substituted polysiloxane]

$$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_p-\left[\underset{\underset{CH_3}{|}}{\overset{\overset{(CH_2)n}{|}}{Si}}-O\right]_q-\underset{\underset{CH_3}{|}}{\overset{\overset{CH_3}{|}}{Si}}-CH_3$$

where
n≧3;
p=1–1000; and
q=1–25.

9. Fatty acid esters of sorbitan and sugar having the following basic structures:

(1).

[sorbitan structure with substituents]
$-(OCH_2CH_2)a-OR_1$
$-(OCH_2CH_2)b-OR_2$
$CH-(OCH_2CH_2)c-OR_3$
$CH_2-(OCH_2CH_2)d-OR4$ wherein
R₁=Hydrogen
R₂ R₃ may be the same of different, can be hydrogen, or of the following structure:

$$-\overset{\overset{}{\|}}{\underset{\underset{O}{}}{C}}-R$$

wherein
R is selected from any linear or branched, saturated or unsaturated, substituted or non-substituted alkyl or aliphatic hydrocarbon moiety of greater than 6 carbon chain length, preferably between 8–30 carbons, and more preferably between 12–24 carbons.
R₄ has the following structure:

$$-\overset{\overset{}{\|}}{\underset{\underset{O}{}}{C}}-R'$$

wherein
R' is selected from any linear or branched, saturated or unsaturated, substituted or non-substituted alkyl or aliphatic hydrocarbon moiety of greater than 6 carbon chain length, preferably between 8–30 carbons, and more preferably between 12–24 carbons.

or (2).

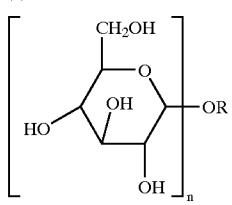

wherein
n≧0, and
R can be selected from any linear or branched, saturated or unsaturated, substituted or non-substituted alkyl or aliphatic hydrocarbon moiety of greater than 6 carbon chain length, preferably between 8–30 carbons, and more preferably between 12–24 carbons, Regardless of the particular softness-enhancing agent utilized in the softening composition of the present invention, it is typically desired that the softness-enhancing agent contains between 8 to 24 carbon atoms in its carbon chain length (i.e., $C_8$–$C_{24}$), particularly having a carbon chain length of $C_{12}$–$C_{24}$, and more particularly, a carbon chain length of $C_{18}$–$C_{24}$. For example, in one embodiment of the present invention, a softness-enhancing agent having a carbon chain length of $C_{22}$ is utilized as the softness-enhancing agent.

Moreover, a softness-enhancing agent of the present invention can also generally be incorporated within the softening composition in various amounts. In particular, a softness-enhancing agent can be utilized in the softening composition in amounts up to about 20% by weight of the composition. In some embodiments, the softness-enhancing agent comprises from about 5% to about 15% of the weight of the softening composition.

As stated, a softening composition used of the present invention also contains a solvent. For instance, in one embodiment, water and/or any of a variety of alcohol-based compounds can be utilized as a solvent of the softening composition. In particular, some solvents that are suitable for use in the present invention include, but are not limited to, water, methanol, ethanol, propanol, isopropanol, glycerin, propylene glycol, ethylene glycol, polypropylene glycol, polyethylene glycol, 1,3-methyl propanediol, isopentyldiol, etc.

In general, a solvent of the present invention can be incorporated within the softening composition in various amounts. In particular, the solvent can be utilized in the softening composition in amounts up to about 40% by weight of the composition. In some embodiments, the solvent compound comprises from about 15% to about 30% of the weight of the softening composition.

Besides the components mentioned above, a variety of other materials can also be utilized in conjunction with a softening composition of the present invention. In fact, any material can be added to the softening composition as long as the material does not substantially affect the ability of the composition to impart softness to a tissue product. In fact, it has been discovered that a softening composition of the present invention can be particularly useful in delivering certain active ingredients to a tissue product. Specifically, due the combination of the components mentioned above, a softening composition of the present can be formulated as a liquid. This liquid composition can thus act as an effective carrier for various active ingredients desired to be applied to a tissue product.

For example, when desired, various ingredients can be incorporated into to the softening composition to provide certain personal care benefits, such as odor minimization. For example, in one embodiment of the present invention, bath tissue can be applied with a softening composition of the present invention that also contains certain odor control properties. In particular, the softening composition can contain additives that mask, inhibit, or even prevent some odors generated in the genital and perianal areas of the body.

In one embodiment, an odor absorber can be incorporated within a softening composition of the present invention. Some examples of suitable odor absorbers include, but are not limited to, hydrophilic polymeric encapsulated metallic carbonated and bicarbonated compounds, zinc oxide, unsubstituted cyclodextrins, cyclodextrin derivatives, combinations thereof, and the like.

One specific example of a suitable metallic compound that can be used in the present invention is encapsulated sodium bicarbonate. Moreover, some particular examples of cyclodextrins that can be used in the present invention include α-cyclodextrin, hydroxyalkyl α-cyclodextrin, alkyl α-cyclodextrin, β-cyclodextrin, hydroxyalkyl β-cyclodextrin, alkyl β-cyclodextrin, γ-cyclodextrin, hydroxyalkyl γ-cyclodextrin, and alkyl γ-cyclodextrin. In some embodiments, cyclodextrins and cyclodextrin derivatives can be particularly useful in masking certain odors. Specifically the cyclodextrin compounds generally reduce odor by forming a complex with odor-causing molecules present within the body fluid. The processing of forming the cyclodextrin complex can be activated when the cyclodextrin compounds come into contact with the waste body fluid.

Odor absorbers can generally be incorporated into the softening composition in amounts up to about 30% by weight of the composition. In some embodiments, the odor absorbers can be applied in an amount between about 0.5% to about 15%, and more particularly between 1% to about 10%. Moreover, the odor absorbers can be applied during or after formation of the softening composition. In some embodiments, for example, the composition incorporated with odor absorbers can be agitated and/or heated to ensure adequate mixing.

In addition to odor absorbers, masking fragrances can also be incorporated within the softening composition to "mask" the odor generated in certain areas of the body, such as the genital and perianal areas. Some examples of suitable masking fragrances can include, but are not limited to, benzyl acetate, benzyl salicylate, iso-bornyl acetate, p-t-butyl cyclohexyl acetate, cetronellol, hexyl cinnamic aldehyde, indole, phenyl ethyl alcohol, vanillin, combinations thereof, and the like. Masking fragrances can generally be incorporated into the softening composition in amounts up to about 2% by weight of the composition. In some embodiments, the masking fragrances can be applied in an amount between about 0.01% to about 1%, and more particularly between 0.01% to about 0.5%.

Furthermore, various other materials can also be applied to inhibit or prevent odor. For instance, in some embodiments, certain anti-oxidant compounds can be incorporated within the composition to inhibit the formation of odiferous compounds on the human body. For example, apocrine sweat is an initially odorless sweat containing proteins, pyrodextrose, iron ions, ammonia, and lipofuscin compounds. Moreover, sebaceous sweat glands produce sebum, which contains triglycerides, wax esters, squalene, and cholesterol. Various bacteria located on the surface of human skin will typically transform some of these components into unsaturated, longer chain fatty acid compounds, which are later oxidized into odiferous, saturated, shorter chain fatty acid compounds. As such, anti-oxidants can generally be utilized to prevent the oxidation of unsaturated, longer chain fatty acid compounds into saturated, shorter chain fatty acids, thereby inhibiting odor production.

Some examples of anti-oxidants that can be utilized in a softening composition of the present invention include, but are not limited to, Vitamin E, Vitamin E derivatives, Vitamin C, Vitamin C derivatives, Vitamin A palmitate, butylated hydroxy toluene, phenols, phenolic derivatives, thiodipropionate esters, hydroquinone derivatives, alkylated aryl amine, combinations thereof, and the like. Anti-oxidants can generally be incorporated into the softening composition in amounts up to about 10% by weight of the composition. In some embodiments, the anti-oxidants can be applied in an amount between about 0.01% to about 2%, and more particularly between 0.01% to about 1%.

Still other ingredients can be incorporated within the softening composition to further inhibit odor. In particular, various anti-microbial agents can be utilized to kill bacteria located on the skin that are responsible for the production of various odiferous compounds. For instance, some suitable anti-microbial agents include, but are not limited to, bisphenols, such as Triclosan; quaternary ammonium compounds, such as benzalkonium chloride; esters of parahydroxy benzoic acid, such as methyl parabens; formaldehyde and formaldehyde donors, such as 2-bromo-2-nitro-1,3 propanediol, hydantoins, diazolidinyl urea, and imidazolidinyl urea; alkylisothizaolinones; phenoxyethanol; combinations thereof, and the like. The anti-microbial agents describe above can generally be incorporated into the softening composition in amounts up to about 10% by weight of the composition. In some embodiments, these anti-microbial agents can be applied in an amount between about 0.05% to about 5%, and more particularly between 0.1% to about 3%.

Other examples of suitable anti-microbial agents can include various metallic compounds that are capable of readily binding to skin to inhibit the activity of certain bacterial exo-enzymes that can result in the production of malodor. For example, exo-enzymes, such as aryl-sulfatases and beta-glucuronidases, are required to break down the steroids secreted with apocrine sweat and selbum, which results in malodor. Thus, by inhibiting the activity of such exo-enzymes, malodor can be inhibited. For instance, in one embodiment, metallic compounds, such as zinc and zinc compounds (e.g., zinc glycinate) can be utilized in the present invention to inhibit microbial activity on the skin. These anti-microbial agents can generally be incorporated into the softening composition in amounts up to about 10% by weight of the composition. In some embodiments, these anti-microbial agents can be applied in an amount between about 0.05% to about 5%, and more particularly between 0.1% to about 2%.

Moreover, in some instances, certain anti-microbial agents can also be utilized within the softening composition that also serve other functions. For example, in one embodiment, an anti-microbial agent can be utilized that also act as masking fragrances. Examples of such anti-microbial agents that can also mask odors include, but are not limited to, essential oils containing eugenol or phenol functionalities, such as clove oil, pimento oil, citronellol, geraniol, rose oil, cassia oil, sandlewood oil, undecyl alcohol, undecylenic alcohol, eugenol, combinations thereof, and the like. Because these anti-microbial agents are relatively weak, they are generally incorporated into the softening composition in amounts from about 3% to about 20% by weight of the composition. In some embodiments, these anti-microbial agents can be applied in an amount between about 3% to about 10%, and more particularly between 3% to about 5%.

In addition, as stated above, some softeness-enhancing agents used in the softening composition can also possess anti-microbial properties. For instance, fatty acids, glycerides (mono-, di-, and triglycerides), monsaccharide fatty acid esters, combinations thereof, and the like, can have some anti-microbial properties. Moreover, by varying the carbon chain length of the softeness-enhancing agent, the anti-microbial properties thereof can also be varied. For instance, fatty acids that contain saturated fatty acid chains from $C_{10}$–$C_{14}$ carbon chain lengths can have maximized anti-microbial properties. Moreover, monosaturated fatty acid derivatives, such as palmitoleic, have a carbon chain length of $C_{16}$ to maximize anti-microbial properties. For polyunsaturated fatty acids, particularly carbon chain lengths are between $C_{18}$–$C_{20}$ to maximize anti-microbial properties. It should be understood that a softness-enhancing agent of the softening composition need not have any anti-microbial properties. Moreover, any compound having anti-microbial properties can also be used in combination with the softness-enhancing agent incorporated within the softening composition.

In addition to the materials described above, various other ingredients can be applied to a softening composition of the present invention. For instance, if desired, various soothing agents, anti-inflammatory agents, anti-irritation agents, etc. can also be utilized. Examples of such ingredients include, but are not limited to, essential oils, such as anise oil, fennel oil, caraway oil, peppermint oil; Vitamins A, C, and E and their derivatives; aloe vera products; chamomile extracts; comfrey products, St. John's Wort products; Witch Hazel products; Marshmallow leaf and root products; etc. Although these ingredients can be added at any amount, they are typically incorporated into the softening composition in amounts up to about 10% by weight of the composition. In some embodiments, these ingredients can be applied in an amount between about 0.05% to about 5%, and more particularly between 0.1% to about 3%.

Moreover, a variety of foaming aids can be applied to the softening composition when foaming the composition onto a tissue. Foaming aids can be useful in facilitating the generation of foam from a softening composition. A foaming aid can also be useful in stabilizing existing foam. In general, any of a variety of foaming aids can be applied to the softening composition of the present invention. In particular, foaming aids that have a low critical miscelle concentration, are cationic and/or amphoteric, and have small bubble sizes are typically utilized. Some examples of suitable foaming aids include, but are not limited to, fatty acid amines, and/or amides; amine oxides; fatty acid quaternary compounds; electrolytes (to help achieve foam stability); and the like. Some commercially available foaming aids that are suitable in the present invention are Mackernium 516 and Mackam CBS-50G made by McIntyre Group, Ltd. When utilized, the foaming aids are generally incorporated into the softening composition in amounts up to about 20% by weight, and particularly between about 2% by weight to about 15% by weight. Other suitable foaming aids are described in U.S. Pat. No. 4,581,254 to Cunningham, et al., which is incorporated herein in its entirety by reference thereto.

Other examples of suitable materials that can be added to a softening composition for application to various tissue products are disclosed in U.S. Pat. No. 5,869,075 to Krzysik, which is incorporated herein by reference. For instance, some of such materials include, but are not limited to, anti-foaming agents (reduce the tendency of foaming during processing); anti-fungal actives; anti-septic actives; other anti-oxidants (for product integrity); astringents—cosmetic (induce a tightening or tingling sensation on skin); astringent—drug (a drug product which checks oozing, discharge, or bleeding when applied to skin or mucous membrane and works by coagulating protein); biological additives (enhance the performance or consumer appeal of the product); colorants (impart color to the product); emollients (help to maintain the soft, smooth, and pliable appearance of the skin by their ability to remain on the skin surface or in the stratum corneum to act as lubricants, to reduce flaking, and to improve the skin's appearance); external analgesics (a topically applied drug that has a topical analgesic, anesthetic, or antipruritic effect by depressing cutaneous sensory receptors, of that has a topical counter-irritant effect by stimulating cutaneous sensory receptors); film formers (to hold active ingredients on the skin by producing a continuous film on skin upon drying); humectants (increase the water content of the top layers of the skin); natural moisturizing agents (NMF) and other skin moisturizing ingredients known in the art; opacifiers (reduce the clarity or transparent appearance of the product); skin conditioning agents; skin exfoliating agents (ingredients that increase the rate of skin cell turnover such as alpha hydroxy acids and beta hydroxyacids); skin protectants (a drug product which protects injured or exposed skin or mucous membrane surface from harmful or annoying stimuli); and the like.

To form a softening composition of the present invention, the silicone polymer, surfactant, softeness-enhancing agent, solvent, and any other additional ingredients can be blended together in a variety of ways. For instance, in one embodiment, the ingredients are blended with moderate agitation for about 5 to about 10 minutes. The resulting formulation is a liquid that can generally stand at room temperature for substantial amounts of time without re-solidifying. In some embodiments, such as when utilizing softeness-enhancing agents having a carbon chain length greater than $C_{18}$, some initial heating may be required. After initial heating, the melted components can then be added to the other liquid components and mixed therewith.

By formulating a softening composition with a solvent, a silicone polymer, a surfactant, and a softness-enhancing agent, in accordance with the present invention, the resulting softening composition can provide numerous benefits when applied to the tissue. For instance, as stated above, the composition can impart softness, improve hand feel, and easily bond to the tissue.

In addition, as stated, the softening composition can also generally be formed as a liquid at room temperature. Moreover, the composition can remain a liquid for an extended period of time without substantially re-solidifying. In particular, softeness-enhancing agents having a relatively long carbon chain length (i.e, greater than about $C_{18}$) typically impart a solid or semi-solid state to compositions. However, when utilized in accordance with the present invention, such agents do not generally result in the formation of a semi-solid or solid softening composition. Nevertheless, it should be understood that, in certain instances, the particular components of the components of the composition may require some initial heating to achieve a liquid state. For example, in some embodiments, softeness-enhancing agents having a carbon chain length greater than $C_{18}$ may require some heating before being added.

A softening composition formed as a liquid in accordance with the present invention can provide a number of benefits. For example, in some instances, additional ingredients, such as described above, can be more easily incorporated within the softening composition. Moreover, when applied to a tissue utilizing certain application techniques, a liquid softening composition can also provide substantial processing benefits. In particular, it has been discovered that the softening composition of the present invention is particularly well suited to be applied to a tissue as a foam. Specifically, the liquid nature of the softening composition enables it to readily form a foam when mixed with a gas under appropriate conditions.

Although the softening composition of the present invention has been described as being applied to paper webs, such as tissues, it should also be understood that the softening composition of the present invention can be applied to any type of substrate, such as wipes made from meltblown webs, spunbonded webs, webs containing pulp and other polymeric fibers, hydroentangled webs, air-laid webs, wet-laid webs, and the like. Moreover, to apply the softening composition onto a substrate, any of a variety of methods of application, such as printing, print creping, spraying, using a blade, saturating, coating, droplet throwing, foaming, soaking, etc., can be utilized.

Tissue products made according to the present invention can generally be formed in a variety of ways. For example, the tissue product can be a single or multi-ply tissue. Moreover, in some instances, one or more plies of a tissue can contain multiple layers of fibrous materials. In addition, the basis weight of a tissue product made according to the present invention can, in some embodiments, be less than about 120 grams per square meter, particularly between about 5 to about range about 50 grams per square meter, and more particularly between about 10 to about 35 grams per square meter.

The tissue product of the present invention can also be formed from a variety of different materials. In particular, a variety of natural and/or synthetic fibers can be used. For example, some suitable natural fibers include, but are not limited to, nonwoody fibers, such as abaca, sabai grass, milkweed floss fibers, pineapple leaf fibers; softwood fibers, such as northern and southern softwood kraft fibers; hardwood fibers, such as eucalyptus, maple, birch, aspen, and the like. In addition, furnishes including recycled fibers may also be utilized. Moreover, some suitable synthetic fibers include, but are not limited to, hydrophilic synthetic fibers, such as rayon fibers and ethylene vinyl alcohol copolymer fibers, as well as hydrophobic synthetic fibers, such as polyolefin fibers.

Further, the tissue product of the present invention can be formed according to various papermaking processes known in the art. In particular, any process capable of forming a paper web can be utilized in the present invention. For example, the papermaking process can utilize creping, embossing, wet-pressing, through-drying, through-dry creping, uncreped through-drying, double creping, as well as other steps and methods used to form a multilayered paper web.

The present invention may be better understood with reference to the following examples.

EXAMPLE 1

The ability to form a softening composition of the present invention was demonstrated. Initially, 5 lbs of propylene glycol obtained from Union Carbide (solvent) was mixed with 14.5 lbs of water (solvent) in a mixing tank and heated to about 150° F. while stirring at about 500 rpm. After forming the mixture, 9.76 lbs of Incroquat Behenyl HE from Croda, Inc. (softness-enhancing agent) was applied to the mixture and agitated until the solids were melted. Thereafter, 1 lbs of Lauracidin from Glenn Corp. (softness-enhancing agent having antimicrobial properties) was also applied to the mixture and agitated until the solids again melted.

The remaining ingredients were then applied to the mixture, one at a time. In particular, 5 lbs of Albiquat 3272 from Goldschmidt Corp. (silicone polymer), 1 lbs of Abil B8852 from Goldschmidt Corp. (surfactant), 2 lbs of Abil B8863 from Goldschmidt Corp. (surfactant), and 1.76 lbs of Abil B 88183 from Goldschmidt Corp. (surfactant), were sequentially added to the mixture. The mixture was then agitated for 5 minutes at 1000 rpm until the ingredients became well blended. Thereafter, heating was discontinued and the mixture was stirred at 300–500 rpm until the mixture cooled to room temperature.

EXAMPLE 2

The ability to form a softening composition of the present invention was demonstrated. Initially, 5 lbs of propylene glycol obtained from Union Carbide (solvent) was mixed with 13.5 lbs of water (solvent) in a mixing tank and heated to about 150° F. while stirring at about 500 rpm. After forming the mixture, 9.76 lbs of Mackernium=601 DES from McIntyre Group, Ltd. (softness-enhancing agent) was applied to the mixture and agitated until the solids were melted. Thereafter, 2 lbs of Phospholipid PTC from Mona (softness-enhancing agent having antimicrobial properties) was also applied to the mixture and agitated until the solids again melted.

The remaining ingredients were then applied to the mixture, one at a time. In particular, 6 lbs of Albiquat 3272 from Goldschmidt Corp. (silicone polymer), 2 lbs of Abil B8863 from Goldschmidt Corp. (surfactant), and 1.76 lbs of Abil B 88183 from Goldschmidt Corp. (surfactant), were sequentially added to the mixture. The mixture was then agitated for 5 minutes at 1000 rpm until the ingredients became well blended. Thereafter, heating was discontinued and the mixture was stirred at 300–500 rpm until the mixture cooled to room temperature.

Although various embodiments of the invention have been described using specific terms, devices, and methods, such description is for illustrative purposes only. The words used are words of description rather than of limitation. It is to be understood that changes and variations may be made by those of ordinary skill in the art without departing from the spirit or scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A softening composition comprising:

a silicone polymer in an amount from about 15% to about 40% by weight of said softening composition;

a silicone polyether in an amount from about 5% to about 20% by weight of said softening composition;

a softness-enhancing agent;

an alcohol-based solvent; and optionally, an odor control additive.

2. A softening composition as defined in claim 1, wherein said silicone polymer has the following structure:

$$R-\underset{R_2}{\overset{R_1}{\underset{|}{N^+}}}-Z[-\underset{CH_3}{\overset{CH_3}{\underset{|}{Si}}}-O]_a-[\underset{CH_3}{\overset{CH_3}{\underset{|}{Si}}}]_b-Z-\underset{R_2}{\overset{R_1}{\underset{|}{N^+}}}-R' \quad 2X^-$$

wherein, a, b ≧ 0 and a+b ≧ 1;

$R_1$ is selected from $C_1$–$C_6$ alkyls and $C_1$–$C_6$ hydroxyalkyls;

$R_2$ is selected from $C_1$–$C_6$ alkyls and $C_1$–$C_6$ hydroxyalkyls;

R is selected from $C_8$–$C_{24}$ aliphatic hydrocarbons;

R' is selected from $C_8$–$C_{24}$ aliphatic hydrocarbons;

Z is a substituent comprising the following structure:

$$-(CH_2)_j-CHOH-CH_2-O-(CH_2)_k-$$

where j is greater than or equal to 1 and k is greater than or equal to 1; and

X is an ion.

3. A softening composition as defined in claim 1, wherein said silicone polyether has the following structure:

$$CH_3-\underset{CH_3}{\overset{CH_3}{\underset{|}{Si}}}-O[-\underset{CH_3}{\overset{CH_3}{\underset{|}{Si}}}-O]_a-[\underset{R}{\overset{CH_3}{\underset{|}{Si}}}-O]_b-\underset{CH_3}{\overset{CH_3}{\underset{|}{Si}}}-CH_3$$

$$\underset{R'}{\underset{|}{\underset{(CH_2C(CH_3)HO)_n}{\underset{|}{\underset{(CH_2CH_2O)_m}{\underset{|}{O}}}}}}$$

wherein, a, b ≧ 1;

R is selected from $C_1$–$C_6$ alkyls and $C_1$–$C_6$ hydroxyalkyls;

R' is selected from hydrogen, $C_1$–$C_6$ alkyls, and $C_1$–$C_6$ hydroxyalkyls;

m is between about 1 to about 500; and n is between about 0 to about 300.

4. A softening composition as defined in claim 3, wherein the ratio of n to m is less than about 1.

5. A softening composition as defined in claim 3, wherein the ratio of n to m is less than about 0.50.

6. A softening composition as defined in claim 3, wherein the ratio of n to m is less than about 0.25.

7. A softening composition as defined in claim 3, wherein the cloud point of said silicone polyether is greater than about 50° C.

8. A softening composition as defined in claim 3, wherein the cloud point of said silicone polyether is less than about 50° C.

9. A softening composition as defined in claim 1, wherein said softness-enhancing agent has a carbon chain length of $C_8$ to $C_{24}$.

10. A softening composition as defined in claim 1, wherein said softness-enhancing agent has a carbon chain length of $C_{12}$ to $C_{24}$.

11. A softening composition as defined in claim 1, wherein said softness-enhancing agent has a carbon chain length of $C_{18}$ to $C_{24}$.

12. A softening composition as defined in claim 1, wherein said softness-enhancing agent possess anti-microbial properties.

13. A softening composition as defined in claim 1, wherein said odor control additive is selected from the group consisting of odor absorbers, masking fragrances, anti-oxidants, anti-microbial agents, and combinations thereof.

14. A softening composition as defined in claim 13, wherein said odor absorbers comprise a cyclodextrin compound.

15. A softening composition as defined in claim 13, wherein said anti-microbial agents comprise a fatty acid.

16. A softening composition as defined in claim 15, wherein said fatty acid contains a carbon chain length between $C_{10}$–$C_{14}$.

17. A softening composition as defined in claim 1, further comprising up to about 20% of a foaming agent.

18. A softening composition as defined in claim 1, wherein said softness-enhancing agent is present in an amount from about 5% to about 15% by weight of said composition.

19. A softening composition as defined in claim 1, wherein said alcohol-based solvent is present in an amount from about 15% to about 30% by weight of said composition.

20. A softening composition comprising:
(1) a silicone polymer in an amount from about 15% to about 40% by weight of said softening composition, said silicone polymer having the following structure:

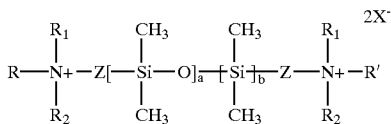

wherein,
a, b≧0 and a+b ≧1;
$R_1$ is selected from $C_1$–$C_6$ alkyls and $C_1$–$C_6$ hydroxyalkyls;
R2 is selected from $C_1$–$C_6$ alkyls and $C_1$–$C_6$ hydroxyalkyls;
R is selected from $C_8$–$C_{24}$ aliphatic hydrocarbons;
R' is selected from $C_8$–C24 aliphatic hydrocarbons;
Z is a substituent comprising the following structure:

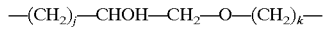

where j is greater than or equal to 1 and k is greater than or equal to 1, and
X is an ion;
(2) a surfactant comprising a silicone polyether in an amount from about 5% to about 20% by weight of said softening composition, said silicone polyether having the following structure:

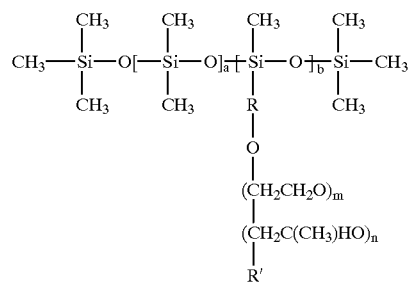

wherein,
a, b≧1;
R is selected from $C_1$–$C_6$ alkyls and $C_1$–$C_6$ hydroxyalkyls;
R' is selected from hydrogen, $C_1$–$C_6$ alkyls, and $C_1$–$C_6$ hydroxyalkyls;
m is between about 1 to about 500;
n is between about 0 to about 300;
(3) a softness-enhancing agent having a carbon chain length of $C_8$ to $C_{24}$;
(4) a solvent; and
(5) optionally, an odor control additive selected from the group consisting of odor absorbers, masking fragrances, anti-oxidants, anti-microbial agents, and combinations thereof.

21. A softening composition as defined in claim 20, wherein the ratio of n to m is less than about 1.

22. A softening composition as defined in claim 20, wherein the ratio of n to m is less than about 0.50.

23. A softening composition as defined in claim 20, wherein the ratio of n to m is less than about 0.25.

24. A softening composition as defined in claim 20, wherein the cloud point of said silicone polyether is greater than about 50° C.

25. A softening composition as defined in claim 20, wherein the cloud point of said silicone polyether is less than about 50° C.

26. A softening composition as defined in claim 20, wherein said softness-enhancing agent has a carbon chain length of $C_{12}$ to $C_{24}$.

27. A softening composition as defined in claim 20, wherein said softness-enhancing agent has a carbon chain length of $C_{18}$ to $C_{24}$.

28. A softening composition as defined in claim 20, further comprising up to about 20% of a foaming aid.

29. A softening composition as defined in claim 20, wherein said softness-enhancing agent is present in an amount from about 5% to about 15% by weight of said composition.

30. A softening composition as defined in claim 20, wherein said solvent contains an alcohol-based solvent present in an amount from about 15% to about 30% by weight of said composition.

31. A softening composition as defined in claim 20, wherein said silicone polymer is present in an amount from about 15% to about 40% by weight of said softening composition.

32. A tissue product comprising:
a web containing cellulosic fibers; and
a softening composition applied to said web, said softening composition comprising a silicone polymer in an amount from about 15% to about 40% by weight of said softening composition, a silicone polyether in an amount from about 5% to about 20% by weight of said softening composition, a softness-enhancing agent, an alcohol-based solvent, and optionally, an odor control additive.

33. A tissue product as defined in claim 32, wherein said silicone polymer has the following structure:

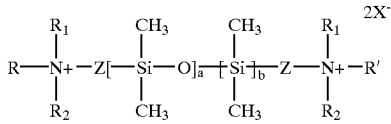

wherein, a, b ≧ 0 and a+b ≧ 1;

$R_1$ is selected from $C_1$–$C_6$ alkyls and $C_1$–$C_6$ hydroxyalkyls;

$R_2$ is selected from $C_1$–$C_6$ alkyls and $C_1$–$C_6$ hydroxyalkyls;

R is selected from C8–C24 aliphatic hydrocarbons;

R' is selected from $C_8$–$C_{24}$ aliphatic hydrocarbons;

Z is a substituent comprising the following structure:

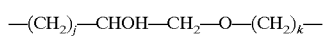

where j is greater than or equal to 1 and k is greater than or equal to 1; and

X is an ion.

34. A tissue product as defined in claim 32, wherein said silicone polyether has the following structure:

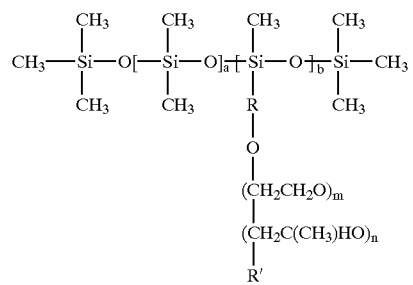

wherein, a, b ≧ 1;

R is selected from $C_1$–$C_6$ alkyls and $C_1$–$C_6$ hydroxyalkyls;

R' is selected from hydrogen, $C_1$–$C_6$ alkyls, and $C_1$–$C_6$ hydroxyalkyls;

m is between about 1 to about 500; and n is between about 0 to about 300.

35. A tissue product as defined in claim 32, wherein said softness-enhancing agent is present in an amount from about 5% to about 15% by weight of said composition.

36. A tissue product as defined in claim 32, wherein said alcohol-based solvent is present in an amount from about 15% to about 30% by weight of said composition.

37. A tissue product as defined in claim 32, wherein said silicone polymer is present in an amount from about 15% to about 40% by weight of said softening composition.

* * * * *